US010829160B2

(12) United States Patent
Krijnen et al.

(10) Patent No.: US 10,829,160 B2
(45) Date of Patent: *Nov. 10, 2020

(54) INTEGRATED VEHICLE HOOD

(71) Applicant: SABIC Global Technologies B.V., Bergen op Zoom (NL)

(72) Inventors: Jeroen Krijnen, Amstenrade (NL); Carlos Pereira, Putnam Valley, NY (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

This patent is subject to a terminal disclaimer.

(21) Appl. No.: 16/545,418

(22) Filed: Aug. 20, 2019

(65) Prior Publication Data
US 2019/0367096 A1 Dec. 5, 2019

Related U.S. Application Data

(63) Continuation of application No. 15/925,947, filed on Mar. 20, 2018, now Pat. No. 10,471,998.

(30) Foreign Application Priority Data

Mar. 27, 2017 (EP) .................... 17163013

(51) Int. Cl.
B62D 25/10 (2006.01)
B62D 25/12 (2006.01)
(Continued)

(52) U.S. Cl.
CPC ............. B62D 25/12 (2013.01); B62D 25/10 (2013.01); B62D 25/16 (2013.01); B62D 29/043 (2013.01); B60Y 2410/122 (2013.01)

(58) Field of Classification Search
CPC ........ B62D 25/10; B62D 25/12; B62D 25/16; B62D 29/043; B60Y 2410/122
(Continued)

(56) References Cited

U.S. PATENT DOCUMENTS 5,054,567 A 10/1991 Hoffman
6,206,122 B1 3/2001 Boothman et al.
(Continued)

FOREIGN PATENT DOCUMENTS

EP 0846612 A2 6/1998
WO 2015052655 A1 4/2015
WO 2016098024 A1 6/2016

OTHER PUBLICATIONS

European Search Report from the European Patent Office for Application No. 17163013.0, Place of Search: The Hague, Date of Completion: Sep. 1, 2017, 2 Pages.

Primary Examiner — Gregory A Blankenship
(74) Attorney, Agent, or Firm — Cantor Colburn LLP

(57) ABSTRACT

A hood of a vehicle includes a rear beam, a front end module or grill opening reinforcement, a thermoplastic central cover extending between the rear beam and the front end module, the thermoplastic central cover comprising reinforcements along sides of the thermoplastic central cover between the rear beam and the front end module, the reinforcements protruding away from a top surface of the thermoplastic central cover, and fenders connected to the front end module and thermoplastic central cover, wherein each fender extends over a respective reinforcement and connects to the top surface of the thermoplastic central cover.

17 Claims, 6 Drawing Sheets

(51) Int. Cl.
 *B62D 25/16* (2006.01)
 *B62D 29/04* (2006.01)

(58) Field of Classification Search
 USPC .............. 296/193.11, 198; 180/69.2, 69.21
 See application file for complete search history.

(56) References Cited

U.S. PATENT DOCUMENTS

| | | | |
|---|---|---|---|
| 6,846,038 | B1 | 1/2005 | White et al. |
| 7,240,753 | B2 | 7/2007 | Ellerman |
| 8,096,611 | B2 | 1/2012 | Maruyama et al. |
| 10,471,998 | B2 * | 11/2019 | Krijnen .................. B62D 25/10 |
| 2005/0161979 | A1 | 7/2005 | Chernoff et al. |
| 2005/0211484 | A1 | 9/2005 | Ellerman |
| 2006/0175104 | A1 | 8/2006 | Etzler et al. |
| 2006/0249988 | A1 | 11/2006 | Jones |
| 2008/0048471 | A1 | 2/2008 | Seksaria et al. |
| 2008/0272518 | A1 | 11/2008 | Steiner et al. |
| 2013/0062894 | A1 * | 3/2013 | Critchley ............... B62D 25/10 |
| | | | 293/149 |
| 2018/0001937 | A1 | 1/2018 | Krijnen et al. |
| 2018/0273111 | A1 | 9/2018 | Krijnen et al. |
| 2019/0367096 | A1 * | 12/2019 | Krijnen .................. B62D 25/12 |
| 2020/0023908 | A1 * | 1/2020 | Krijnen .................. B62D 25/10 |

* cited by examiner

INTEGRATED VEHICLE HOOD

CROSS-REFERENCE TO RELATED APPLICATION

This application is a continuation application of non-provisional U.S. application Ser. No. 15/925,947 filed Mar. 20, 2018, which claims priority to EP Application number 17163013.0 filed Mar. 27, 2017, the entirety of which is incorporated herein by reference.

BACKGROUND

This disclosure relates to a structural component of a vehicle, such as a hood system, in particular a plastic hood system.

Hood systems (also referred to herein as "hood") are large component members of a vehicle body that rotate around a hinge when they open or close. Hoods allow access to engine components in the front of a vehicle, such as a truck. To ensure sufficient strength and stiffness at potentially raised temperatures typically metal or thermoset materials are used to manufacture the hood.

Because the weight of a vehicle body has an impact on the fuel consumption of the vehicle, attempts have been made to produce hoods from lower density materials, such as polymeric materials, in an effort to reduce the overall weight of the vehicle. The use of polymeric materials reduces the overall weight, but might require design modifications in order to meet the needed structural integrity to accommodate loads placed on the hood, such as the aerodynamic loads while driving or the opening and closing the hood repeatedly. There remains a need for a design that allows the use of plastic for a vehicle hood, while still meeting the different stiffness requirements of the hood.

Attempts to increase the panel stiffness and torsional rigidity include increasing the thickness of components of the hood. The use of reinforcements, such as ribs, can affect the ability to efficiently run wires, cables, or the like on the surface of the component. In addition, ribs and other reinforcements negatively impact the aesthetic quality of the component because such features can leave visible imperfections on the components, thus requiring an aesthetic layer (or panel) to provide a finished appearance; again increasing weight and cost.

Accordingly, a need exists for a light-weight hood with high torsional and bending stiffness without diminishing the functional and/or aesthetic quality of the component.

BRIEF DESCRIPTION OF THE DRAWINGS

The following is a brief description of the drawings wherein like elements are numbered alike and which are presented for the purposes of illustrating the exemplary embodiments disclosed herein and not for the purposes of limiting the same.

DETAILED DESCRIPTION

Disclosed herein is a structural component of a vehicle, such as a hood, that has bending and torsional stiffness, in particular, a thermoplastic vehicle component comprising a central cover that extends from a front end module or grill opening reinforcement (hereinafter referred to as front end module), to a rear beam, wherein the central cover including reinforcement, e.g., to enhance bending and torsional stiffness. The hood disclosed herein has a bending and torsion stiffness that meets safety standards and regulations for the particular vehicle on which it is used.

A hood is a portion of a front of a vehicle, such as a truck, bus, or the like, that is designed to open to allow access to engine components thereof. For example, a hood can be hingedly rotated (e.g., forward) to provide access to vehicle systems, e.g., cooling systems, oil, wiper fluid, etc. Due to their relative size, hoods can be subjected to high torsion and bending loads, e.g., from opening and closing the hood or from aerodynamic loads or highway driving loads. Due to the structural integrity requirements of a hood, the use of thermoplastic materials is particularly problematic and difficult at raised temperatures, e.g., greater than or equal to 80° C. It was found that a hood comprising a central cover with reinforcements, extending between and eventually connected to the front end module and the rear beam, has the structural integrity, e.g., has torsion and bending stiffness to meet the requirements on panel/skin stiffness. Additionally, the structural integrity is attained without the aforementioned aesthetic deficiencies. For example, the hood disclosed herein can have a bending and torsional stiffness so as to exceed a natural frequency of 15 hertz (Hz) when latched, and 1 Hz in an open configuration (such as 60 degree vertical inclination of the hood). Local deflections due to a 10 kilogram (Kg) load placed on a 6 centimeter (cm) diameter area (known as "oil canning") is less than 0.5 cm. Finally, the hood can be closed, from an open configuration, even if pulled from a corner of the hood.

Figure 3:
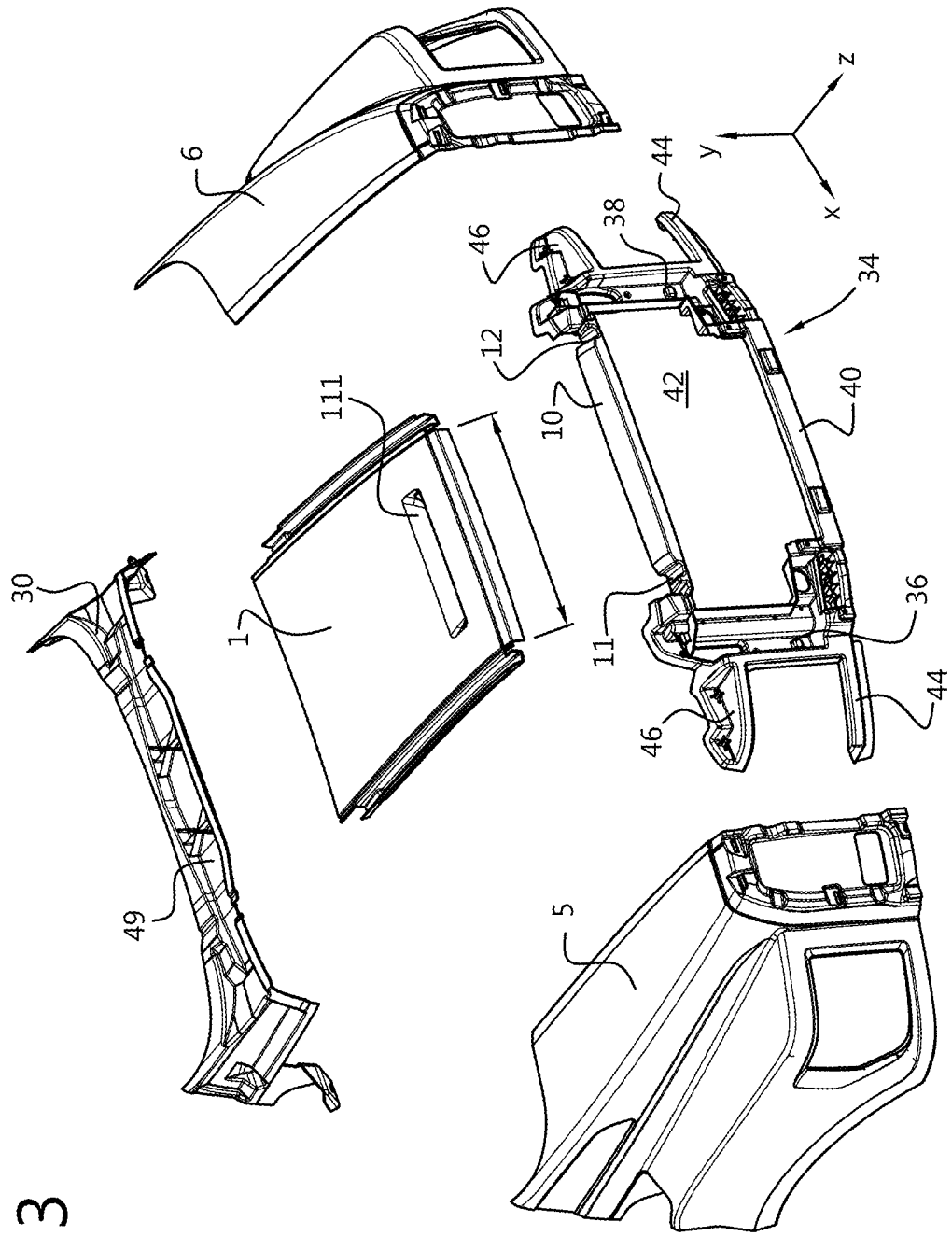
FIG. 3 is a perspective view of the components of a hood system before it is assembled.
Figure 7A:
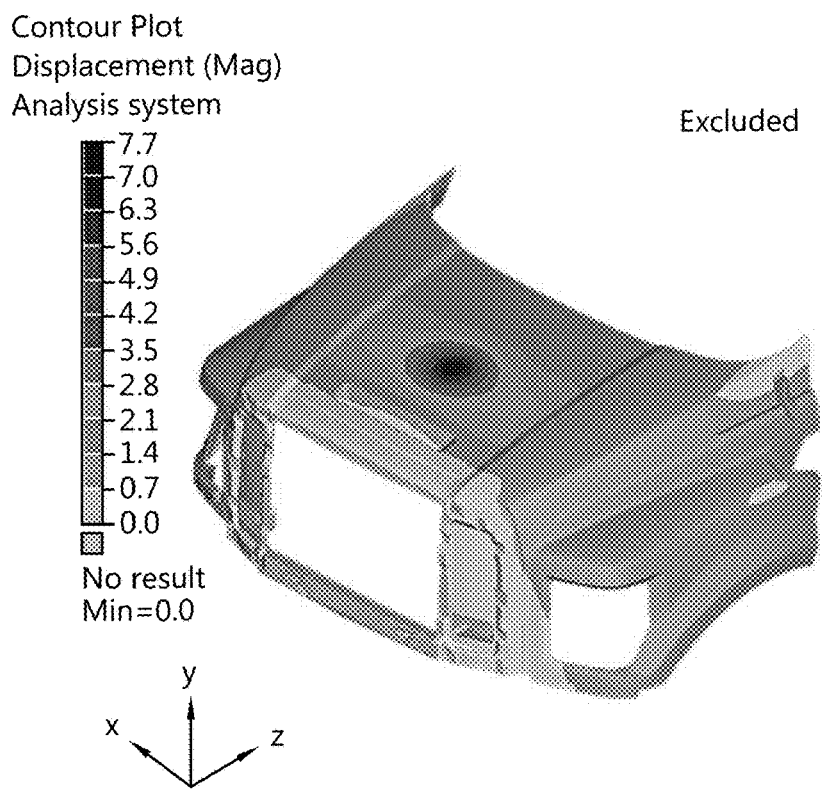
FIG. 7A is a perspective view of the hood system in a simulation showing displacement under vertical load in the center of a hood system without reinforcements.

The central cover comprises the reinforcement and optionally comprises an opening, such as for air flow. The reinforcement can be a channel that extends longitudinally (e.g., in the "Y" direction as illustrated in FIGS. 3 and 7A) between the front end module and the rear beam. The reinforcement can extend longitudinally between the front end module and the rear beam, preferably at least extend from the front end module to the rear beam. The reinforcement can alternatively end a distance from the rear beam or from the front end module (when the cover is assembled with the front end module and the rear beam). For example, the channels can end a distance from the front and/or rear edge of the central cover such that a support member can be placed underneath the central cover without contacting the channels.

The reinforcements can be formed integrally with the central cover, i.e., molded as a single component. Alternatively, the reinforcement can be formed separately and attached to the central cover, e.g., with an adhesive. When formed integrally with the central cover, the reinforcements can be defined by two walls with an optional connecting portion there between. The reinforcement can protrude out of the bottom of the central cover, and can optionally be open on one side (e.g., the top, such as in a U-like shape). The walls of the reinforcement can be located between and connected to an optional flange of the central cover and the main body of the central cover. For example, the first wall can be oriented non-perpendicular to the flange. The second wall can be located perpendicular to the main body. Optionally, the second wall can be located non-perpendicular to the main body. Desirably, the first wall and the second wall converge toward a bottom portion. Optionally, the bottom portion is a single straight member. Optionally the bottom portion is formed of multiple walls. The bottom portion can be a convex connection from the first wall to the second wall.

Each channel can be the same or a different size, depending upon the structural integrity needed in the specific location or available space. Desirably, the channels are located adjacent the outer periphery of the central cover. For example, the main body comprises greater than or equal to 70% of the width and length of the cover, with each channel located within 15% of the width from the edge of the side of the cover. In other words, if the cover is 100 centimeters wide, the main body, between the channels would be greater than or equal to 70 cm wide (see the double headed arrow in FIG. 3), preferably greater than or equal to 80 cm wide. The channel can be of constant depth (the walls are constant and equal). Optionally, the walls can have different lengths. The dimensions of the channel can be selected to attain the desired bending stiffness and torsional stiffness. Bending stiffness is increased by increasing the depth ("d") of the channel. The torsional stiffness is increased by increasing the width ("w") of the channel. (See FIG. 5B) The specific depth and size of the channels can be dependent upon the desired structural integrity and the vehicle components included under the central cover. For example, if the cover is 100 cm wide, and the walls have a uniform thickness of 0.4 cm, the channel can be over 2.0 cm deep and over 2.0 cm wide to attain torsional and bending stiffness.

The central cover should be of a size sufficient to have desired bending stiffness, while covering the entirety of the mechanical components in the front end of a vehicle. The thickness of the central plate can be dependent on the desired stiffness and the materials used for the central plate. For example, the central plate can be 3 to 5 millimeters (mm) thick. The size of the central cover 1 can be dependent upon the size of the vehicle; it can be of a size equal to a portion of the front end of a vehicle not covered by fenders, for example, the central cover can have an area of 1 to 2 square meters ($m^2$), e.g., 1.2 to 1.5 $m^2$.

The use of the channels enables enhanced aesthetics while meeting the stiffness requirements. However, if desired, ribs can be included on the central cover.

Optionally, the central cover and hollow reinforcements can be separately manufactured, such that the central cover can be a flat cover and the channels can be attached to one side of the central cover.

The central cover can extend to, onto, or over the front end module. The front end module can comprise a front beam, side rails extending between the front beam and a connecting bar. The front beam, side rails, and connecting bar can form a frame having a central portion, e.g., a grill opening. Extending from the side rails, away from the central portion and toward the fenders, can be supports (e.g., upper and lower supports). The supports can provide further structural integrity to the fenders, and can support lights (such as headlamps). Optionally, the connecting bar can hingedly attach to the vehicle structure so as to allow the hood to open and close. A fender is a barrier piece that surrounds the wheels of a vehicle to block splashing water or mud. In this application, the fender is a side part of the hood that protects the sides of the mechanical system under the hood.

The front end module can be a structural member such that it has sufficient strength to allow for repeated opening and closing of the hood without damage or failing. The front beam can be shaped complimentary with the central cover. For example, so that the front beam can accept the central cover, such that the central cover can extend over a portion of the front beam and attach thereto. Optionally, the central cover extend over the front beam such that the front beam can attach to the bottom of the cover, such as with an adhesive.

The front beam can further include grooves sized and shaped to receive the reinforcement in the central cover, e.g., such that the central cover can be attached to the front beam. Optionally the central cover can be flush with the front beam. The grooves in the front beam can provide rigidity to the reinforcement in the central cover, inhibiting twisting movement and hence providing torsional stiffness to the hood design.

The supports can extend from the side rails such that they extend over and under an opening in the fender for a light.

Further structural integrity is provided to the hood by the rear beam which can also be a structural member. The rear beam can provide stiffness so as to distribute the load across the entire hood. The rear beam extends at least the width of the central cover, and preferably from one fender to the other fender (e.g., extends the width of the vehicle). The rear beam can be fixedly attached to the central cover. For example, the central cover can extend over and be attached to a flange of the rear beam. The rear beam can be hingedly attached to the body of the vehicle. If the reinforcement of the central cover extends over the rear beam, the rear beam will comprise grooves to receive the reinforcement. The rear beam can further include a rain tray. The rain tray can extend the entire length of the rear beam. The rain tray can be included on the top of the rear beam and can comprise a channel with edges. The edges of the rain tray can run parallel to the windshield, such that the rear edge of the rain tray is flush with the lower edge of the windshield. The rain tray can receive water and debris (such as leaves), such that the water and debris are prevented from reaching the engine components of the vehicle. The rain tray can be formed integral to the rear beam, i.e. formed in the same mold, or can be manufactured separately from the rear beam and attached to the rear beam during assembly.

Attached to the rear beam, the front end module, and the central cover are the fenders. They can be attached via an adhesive and/or a mechanical attachment such as a clip, bolt, snap-fit connection, or similar removable attachment. The fenders can be attached to the central cover such that they extend over the reinforcement. Therefore, if the reinforcement is an open channel (e.g., a U-like shaped channel), the fenders can cover the opening in the channel (e.g., the longitudinal opening). The fenders can at least extend from the front edge to the rear edge of the central cover and over the channels. The edge of the fenders can contact the central cover in a divot, or groove, or furrow designed to receive the fender edge. More preferably, the fenders cover the entirety of the channels such that the channels are not visible from the top of the hood.

The fenders can have an opening for a headlamp. The supports from the front end module can extend behind the fender and above and below the opening. The fenders can integrate additional ribbing at their edges, i.e. around the wheel well and front, to increase the bending stiffness. An additional guard piece can be integrated to the fender to minimize risk of impact from road debris, e.g. gravel, from the wheel well.

The combination of the structural rear beam, front end module, and the central cover with the reinforcement extending between the front end module and the structural rear beam enables torsional stiffness for the hood, allowing the hood to be made of materials such as thermoplastics. Therefore, the hood (e.g., the central cover, fenders, front end module, and/or rear beam) can comprise polymeric material, such as thermoplastic material. Optionally, the central cover can consist of thermoplastic material. Optionally, the fenders can consist of thermoplastic material. Optionally, the front end module and/or rear beam can consist of thermoplastic material. Possible thermoplastic materials include polybutylene terephthalate (PBT); acrylonitrile-butadiene-styrene (ABS); polycarbonate (LEXAN™ and LEXAN™ EXL resins, commercially available from SABIC Innovative Plastics); polycarbonate/PBT blends; polycarbonate/ABS blends; copolycarbonate-polyesters; acrylic-styrene-acrylonitrile (ASA); acrylonitrile-(ethylene-polypropylene diamine modified)-styrene (AES); phenylene ether resins; blends of polyphenylene ether/polyamide (NORYL GTX™ resins, commercially available from SABIC Innovative Plastics); blends of polycarbonate/polyethylene terephthalate (PET)/PBT; polybutylene terephthalate and impact modifier (XENOY™ resins, commercially available from SABIC Innovative Plastics); polyamides; phenylene sulfide resins; polyvinyl chloride PVC; high impact polystyrene (HIPS); low/high density polyethylene (L/HDPE); polypropylene (PP); expanded polypropylene (EPP); and thermoplastic olefins (TPO), as well as combinations comprising at least one of the foregoing.

The thermoplastic can comprise a filler, e.g., a mineral filler. The filler can be fibers, provided the aesthetics requirements on the component are met. The mineral filler can comprise at least one of talc, mica, wollastonite, and calcium carbonate, preferably, the filler comprises talc. For example, the central cover, and optionally the fenders, can comprise a blend of polyamide and polyphenylene ether polymer with mineral filler that has a tensile stress at break, (5 mm/min) of 55-65 MegaPascals (MPa) in accordance with ISO 527 such as NORYL GTX™ resin (e.g., NORYL GTX™ resin 679). For example, the front end module and the rear beam can comprise a blend of polyamide and polyphenylene ether polymer with glass filler that has a tensile stress at break, (5 mm/min) of 100-120 MPa in accordance with ISO 527; such as NORYL GTX™ resin (e.g., NORYL GTX™ resin 830).

Optionally, the rear beam and/or the front end module can comprise metal or a thermoset material. Desirably, the central cover, fenders, the rear beam, and the front end module consist of thermoplastic material. Preferably, at least one of the central cover, fenders, the rear beam, and the front end module is free of metal, more preferably, all of the central cover, fenders, the rear beam, and the front end module are free of metal.

A more complete understanding of the components, processes, and apparatuses disclosed herein can be obtained by reference to the accompanying drawings. These figures (also referred to herein as "FIG.") are merely schematic representations based on convenience and the ease of demonstrating the present disclosure, and are, therefore, not intended to indicate relative size and dimensions of the devices or components thereof and/or to define or limit the scope of the exemplary embodiments. Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

Figure 1:
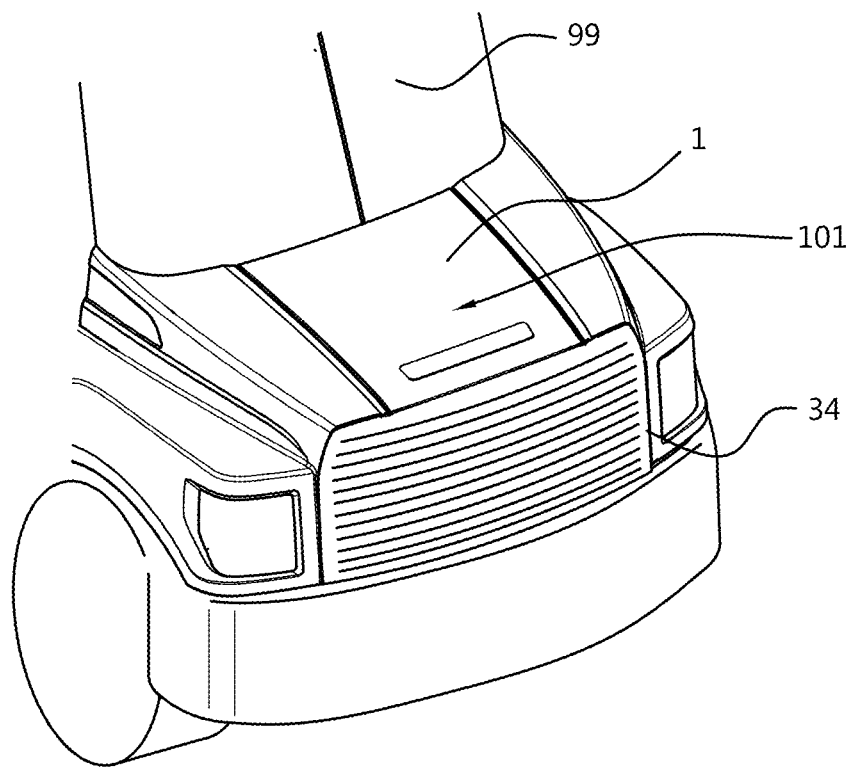
FIG. 1 is a perspective view of the front end of a vehicle including the hood system.
Figure 2:
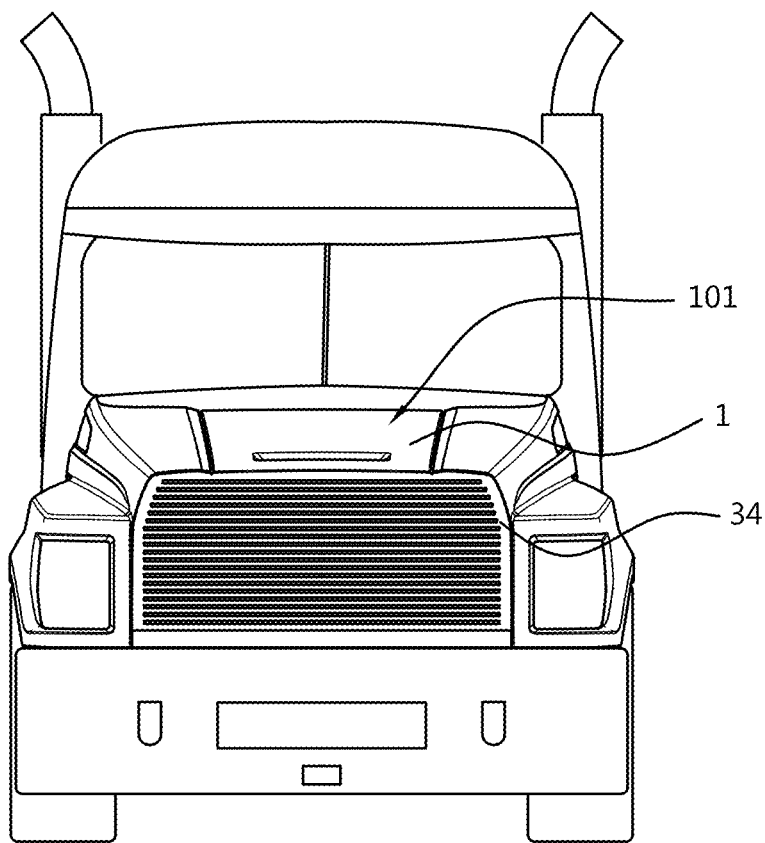
FIG. 2 is view of a portion of the front end of a vehicle.

FIGS. 1 and 2 illustrate a front end of a vehicle (e.g., a truck, bus, train, etc.) including hood 101. As shown in FIG. 1, hood 101 is located in front of the windshield 99 and above the engine. As shown in FIG. 2, the hood 101 can include a central cover 1 that can be used to cover mechanical components of the vehicle. The central cover 1 can significantly affect the aesthetic appearance of the vehicle because it is the predominantly visible section of the front of the vehicle, as shown in FIG. 2.

The hood of a vehicle can include the central cover 1, a rear beam 30, which can provide additional support, fenders 5, 6 and a front end module 34, as shown in FIG. 3. The front end module 34 can comprise the front beam 10, first side rail 36 and second side rail 38 extending between the front beam 10 and a connecting bar 40 (e.g., that can hingedly attach (such as via hinge 18) to the vehicle) (See FIG. 6). Protruding from the side rails 36, 38, in a direction opposition central portion 42, can be lower supports 44 and upper supports 46, e.g., for attaching a light such as a headlamp to the vehicle, and for providing further support and structural integrity to the fenders 5, 6. The front beam 10 can further include grooves 11, 12 sized and shaped to receive the channels 20, 21 in the central cover 1.

Figure 4:
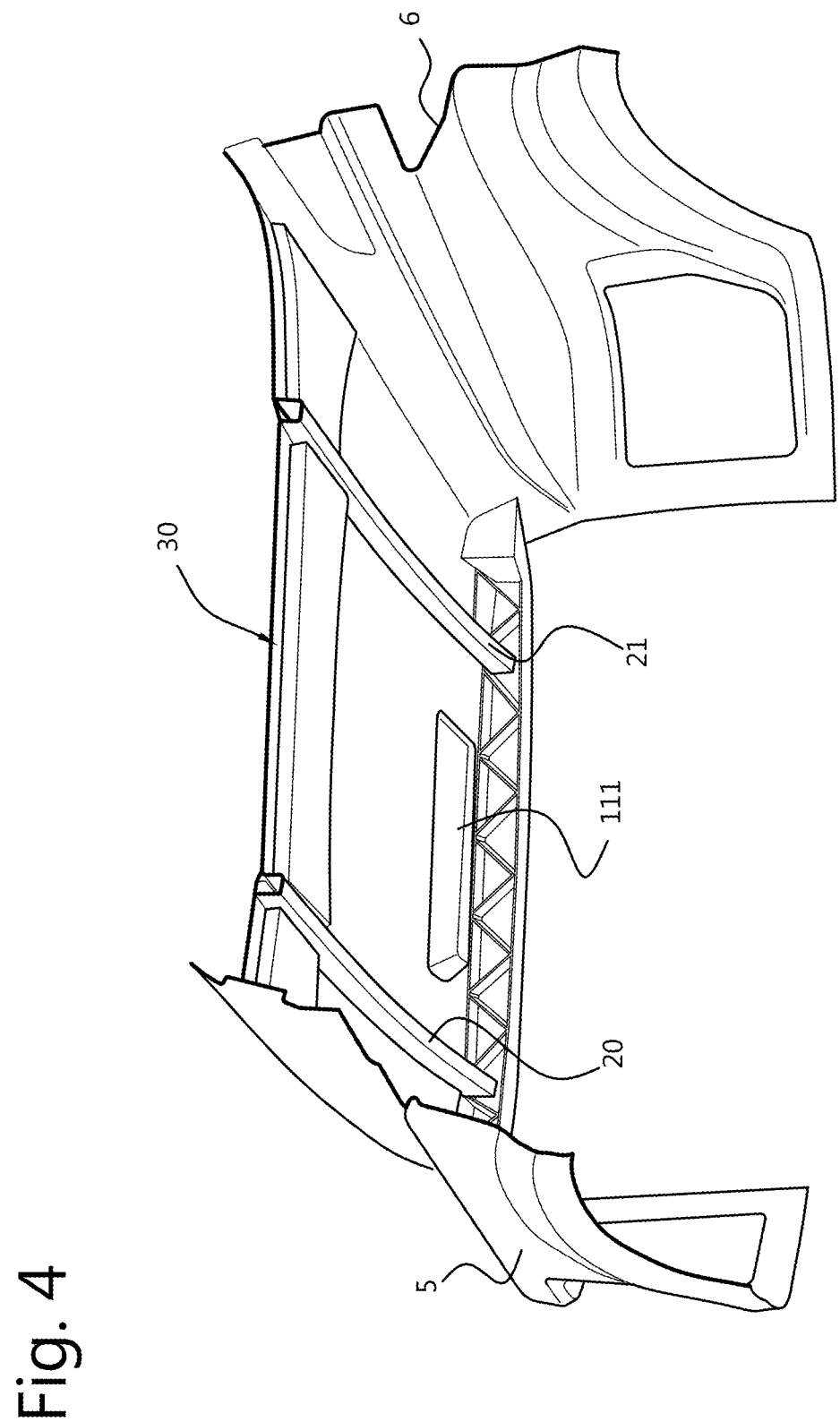
FIG. 4 is a perspective front view of a partially assembled hood.

As shown in FIG. 4, the hood can further include a rear beam 30, which can be used for additional support and/or to attach the hood to the vehicle.

Figure 5A:
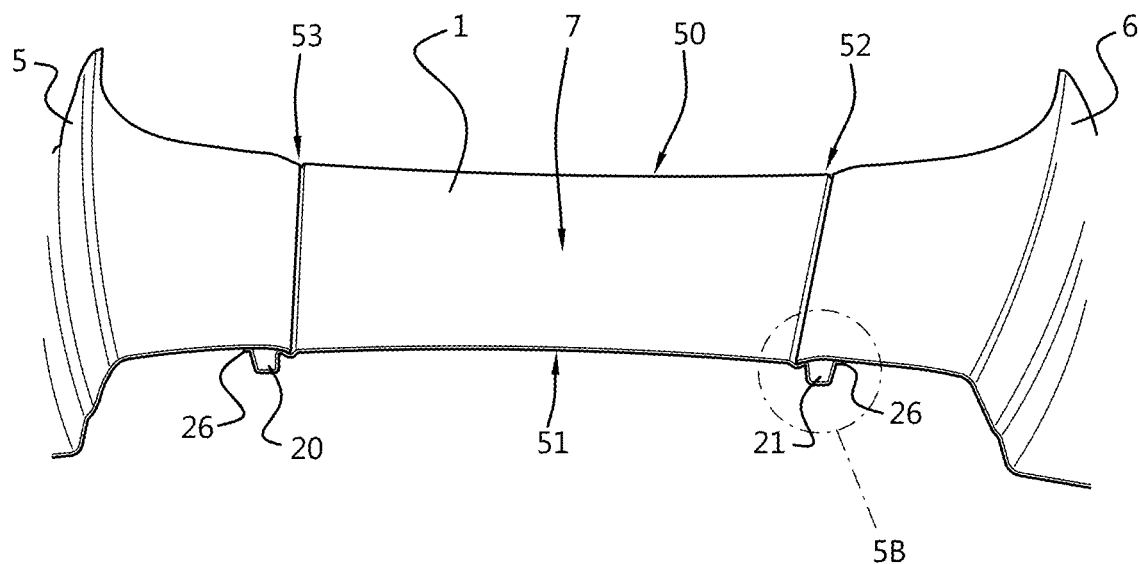
FIG. 5A is a partial top view of a central cover with fenders attached.
Figure 5B:
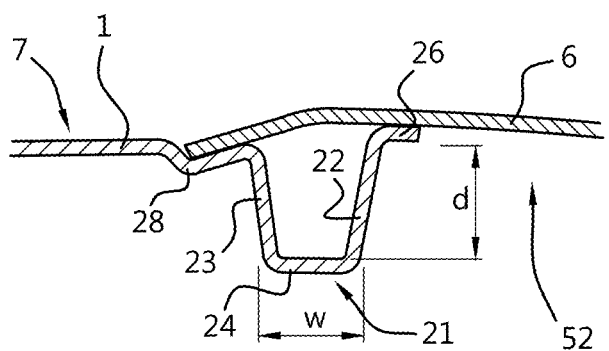
FIG. 5B is an expanded end view of portion 5B from FIG. 5A.

FIGS. 5A and 5B are exploded views of the various components of the hood. As shown in FIG. 5A, the hood includes fenders 5, 6, and central cover 1. Central cover 1 can include a front 51, rear 50, and sides 52, 53. The central cover 1 can include hollow reinforcements, such as channels 20, 21 that extend between the front beam and the front end module, optionally, from the front 51 to the rear 50. The channels 20, 21 can include a first wall 22, a second wall 23, and a bottom portion 24 which connects the first wall 22 and the second wall 23, to define the channel, shown in FIG. 5B. Extending from the first wall 22 can be a flange 26, which extends in a direction opposite a main body 7 of the cover. The main body 7 of the cover extends from one channel to another channel.

The channels 20, 21 can extend across the sides 52, 53 of the central cover 1 from the front edge to the rear edge.

The central cover 1 can further include an optional opening 111 to allow air to pass through to a cooling system or other internal part of a vehicle.

A handle portion (not shown) can be included on the rear beam. For example, a latch 48 or other mechanism for opening the hood can be located on the rear beam such that when released, the hood can pivot around the hinge on the front end module to an open position.

As shown in FIGS. 4 and 5A, fenders 5, 6 are located on the sides 52, 53 of the central cover 1. Fenders 5, 6 can be formed integral with central cover 1, or attached thereto. The fenders 5, 6 can be mounted onto the vehicle by attaching the fenders 5, 6 to the central cover 1, front end module 34 and rear beam 30. The fenders 5, 6 can be attached to the central cover 1 such that they extend over the channels 20, 21, as shown in FIGS. 5A and 5B. The fenders 5, 6, can at least extend from the front edge 51, to the rear edge 50, and over the channels. The edge of the fenders can contact the central cover 1 in a divot or groove 28 designed to receive the fender edge. More preferably, the fenders 5, 6 cover the entirety of the channels 20, 21 such that the channels are not visible from the top of the hood 101, as shown in FIG. 5A.

Figure 6:
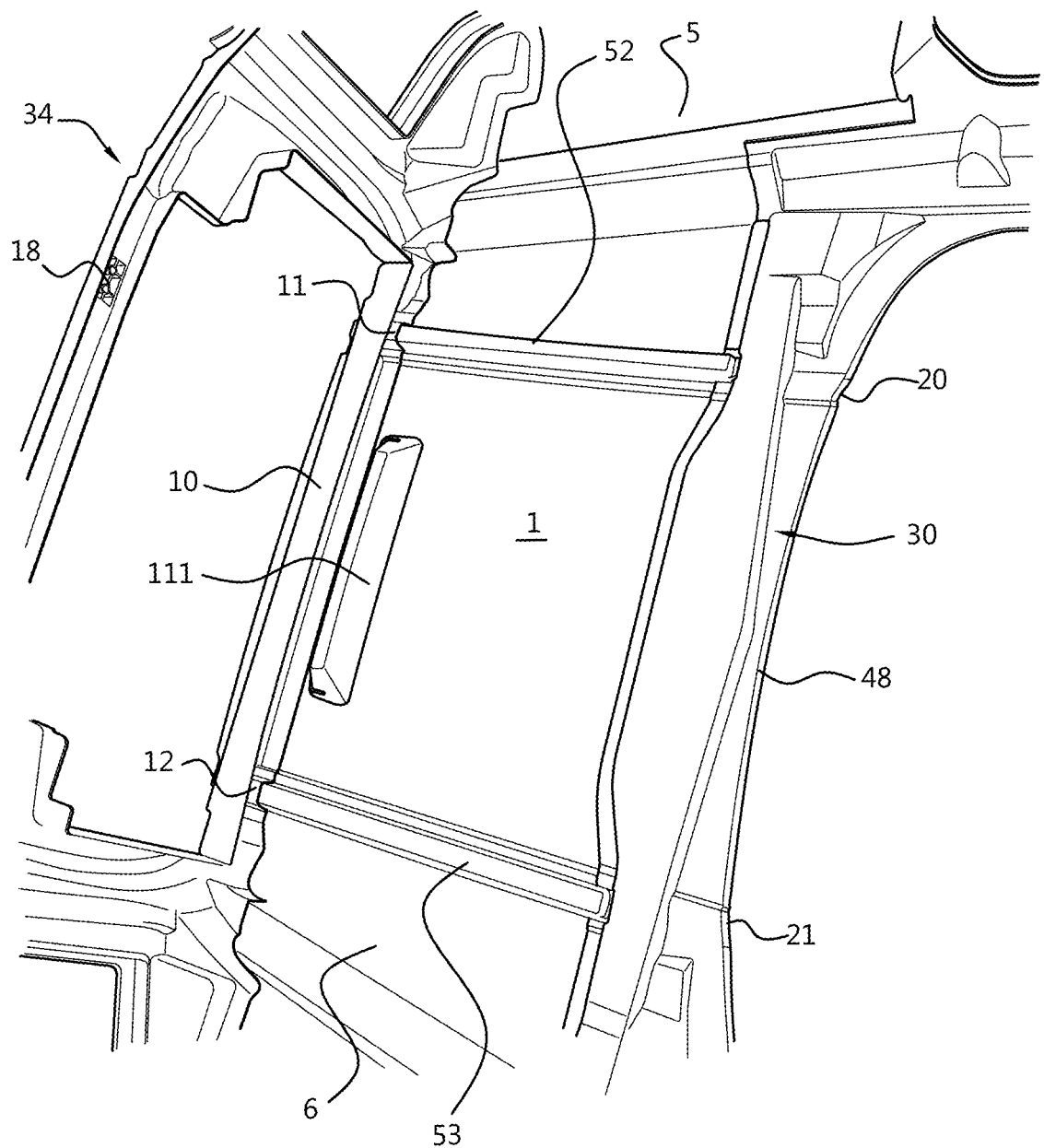
FIG. 6 is a partial bottom view of a hood.

The central cover 1 can be mounted to the front beam and the front end module, which, in turn, can be mounted to the chassis (e.g., to the Body-In-White (BIW)) of a vehicle. The central cover 1 or the rear beam 30 can be used to attach the hood 101 to the vehicle (not shown). As shown in FIG. 6, the rear beam 30 can be shaped such that the central cover 1 can sit flush on top of the rear beam 30. If the rear beam is positioned underneath the channels 20, 21 in the central cover 1 (not shown) the rear beam can include corresponding grooves such that the channels can be accepted onto the corresponding channels of the rear beam. Alternatively, the channels 20, 21 can end before the rear beam 30 such they do not extend onto the rear beam 30. The central cover 1 can be extend onto and be fixedly attached to flange 49 of the rear beam 30. (See FIG. 3)

Figure 7B:
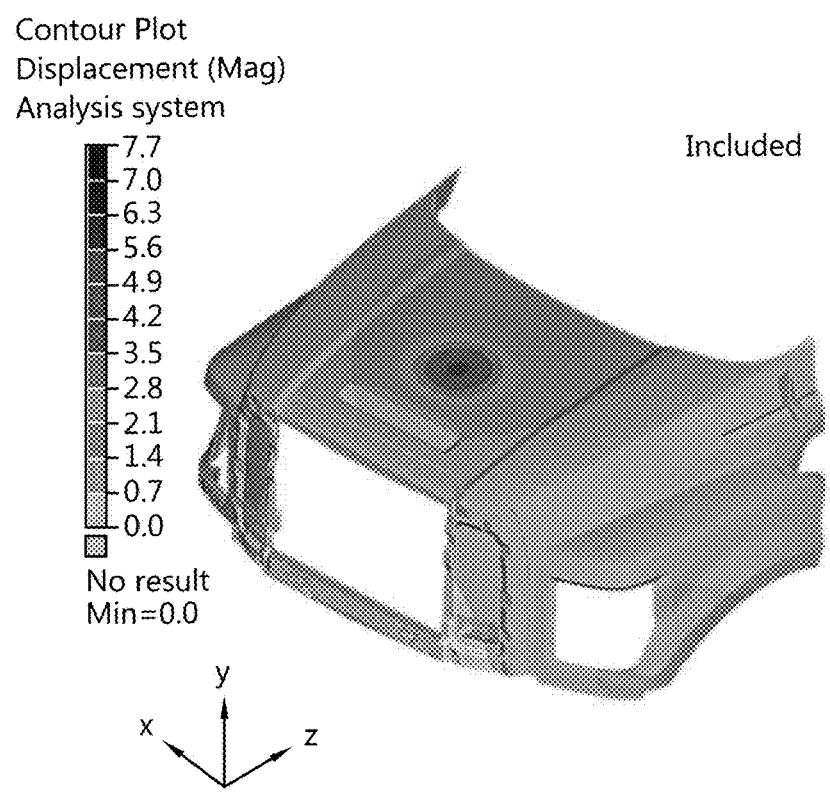
FIG. 7B is a perspective view of the hood system in a simulation showing displacement under vertical load in the center of the hood system with reinforcements.

FIGS. 7A and 7B illustrate a simulation comparing the application of a vertical load to the same location in the central panel in a hood system without reinforcements (FIG. 7A) and one with reinforcements (FIG. 7B). FIG. 7A shows an uneven displacement, wherein the displacement at a magnitude of 3.5 extending in an elliptical shape (with its major axis extending in the Y direction and the major axis extending in the Z direction) across the central cover. The distribution of the load is across less than 70% of the central cover.

In FIG. 7B the distribution of load is substantially more uniform across the central panel, with the displacement being circular down to displacements of 3.5, and then generally distributed across greater than or equal to 75% (preferably greater than or equal to 85%) of the central cover.

The hood systems disclosed herein include at least the following embodiments:

Embodiment 1: A hood of a vehicle, comprising: a rear beam, a front end module, a thermoplastic central cover extending between the rear beam and the front end module, the thermoplastic central cover comprising reinforcements along sides of the thermoplastic central cover between the rear beam and the front end module, the reinforcements protruding away from a top surface of the thermoplastic central cover, and fenders connected to the front end module and thermoplastic central cover, wherein each fender extends over a respective reinforcement and connects to the top surface of the thermoplastic central cover.

Embodiment 2: The hood of Embodiment 1, wherein the reinforcements are hollow reinforcements.

Embodiment 3: The hood of Embodiment 2, wherein the hollow reinforcements are channels that are open on one side and optionally open on ends of the channels.

Embodiment 4: The hood of Embodiments 2 or 3, further comprising a flange extending from a side of the reinforcement, wherein the hollow reinforcements are formed by a first wall extending away from the flange and a second wall extending away from the top surface, and a bottom portion connecting the first wall and the second wall.

Embodiment 5: The hood of Embodiment 4, wherein the first wall meets the flange at a non-perpendicular angle.

Embodiment 6: The hood of any of the preceding Embodiments, wherein the thermoplastic central cover comprises a divot located on a side of the reinforcements for receiving an edge of a fender.

Embodiment 7: The hood of any of the preceding Embodiments, wherein the reinforcements extend from the rear beam to the front end module.

Embodiment 8: The hood of any of the preceding Embodiments, wherein the thermoplastic central cover is free of ribs.

Embodiment 9: The hood of any of the preceding Embodiments, wherein the fenders are made of thermoplastic and are free of ribs.

Embodiment 10: The hood of any of the preceding Embodiments, wherein the thermoplastic central cover and the fenders are free of metal.

Embodiment 11: The hood of any of the preceding Embodiments, wherein the rear beam and the front end module are free of metal.

Embodiment 12: The hood of any of the preceding Embodiments, wherein the thermoplastic central cover is formed from thermoplastic and mineral filler.

Embodiment 13: The hood of any of the preceding Embodiments, wherein the rear beam comprises a rain tray.

Embodiment 14: The hood of any of the preceding Embodiments, wherein the hood has a stiffness that exceeds a natural frequency of 15 Hz when latched.

Embodiment 15: The hood of any of the preceding Embodiments, wherein the hood has a stiffness that exceeds 1 Hz in an open configuration of a 60 degree vertical inclination of the hood.

Embodiment 16: The hood of any of the preceding Embodiments, wherein the hood has a local deflection of less than 0.5 cm due to a 10 kg load placed on a 6 cm diameter area of the hood.

Embodiment 17: The hood of any of the preceding Embodiments, wherein the hood can be closed from an open configuration by pulling from a corner of the hood.

Embodiment 18: The hood of any of the preceding Embodiments, wherein the reinforcements contain ribbing that is covered by the fenders.

Embodiment 19: The hood of any of the preceding Embodiments, wherein the reinforcements are formed integrally with the thermoplastic central cover.

Embodiment 20: The hood of any of the preceding Embodiments, wherein a load applied to the center of the central cover is distributed across greater than or equal to 75% of the central cover, preferably across greater than or equal to 85% of the central cover.

Embodiment 21: A vehicle comprising: a structural body, an engine, and the hood of any of the preceding Embodiments.

In general, the invention may alternately comprise, consist of, or consist essentially of, any appropriate components herein disclosed. The invention may additionally, or alternatively, be formulated so as to be devoid, or substantially free, of any components, materials, ingredients, adjuvants or species used in the prior art compositions or that are otherwise not necessary to the achievement of the function and/or objectives of the present invention. The endpoints of all ranges directed to the same component or property are inclusive and independently combinable (e.g., ranges of "less than or equal to 25 wt %, or 5 wt % to 20 wt %," is inclusive of the endpoints and all intermediate values of the ranges of "5 wt % to 25 wt %," etc.). Disclosure of a narrower range or more specific group in addition to a broader range is not a disclaimer of the broader range or larger group. "Combination" is inclusive of blends, mixtures, alloys, reaction products, and the like. Furthermore, the terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. "Or" means "and/or." The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A hood of a vehicle, comprising:
    a rear beam;
    a front end module;
    a thermoplastic central cover extending between the rear beam and the front end module, the thermoplastic central cover comprising reinforcements along sides of the thermoplastic central cover between the rear beam and the front end module, the reinforcements protruding away from a top surface of the thermoplastic central cover; and
    fenders connected to the front end module and thermoplastic central cover, wherein each fender extends over a respective reinforcement and connects to the top surface of the thermoplastic central cover.

2. The hood of claim 1, wherein the reinforcements are hollow reinforcements.

3. The hood of claim 2, wherein the hollow reinforcements are channels that are open on one side and optionally open on ends of the channels.

4. The hood of claim 1, wherein the thermoplastic central cover comprises a divot located on a side of the reinforcements for receiving an edge of a fender.

5. The hood of claim 1, wherein the reinforcements extend from the rear beam to the front end module.

6. The hood of claim 1, wherein the thermoplastic central cover is free of ribs.

7. The hood of claim 1, wherein the fenders are made of thermoplastic and are free of ribs.

8. The hood of claim 1, wherein the thermoplastic central cover and the fenders are free of metal.

9. The hood of claim 1, wherein the rear beam and the front end module are free of metal.

10. The hood of claim 1, wherein the thermoplastic central cover is formed from thermoplastic and mineral filler.

11. The hood of claim 1, wherein the rear beam comprises a rain tray.

12. The hood of claim 1, wherein the hood has at least one of
    a. a stiffness that exceeds a natural frequency of 15 Hz when latched;
    b. a stiffness that exceeds 1 Hz in an open configuration of a 60 degree vertical inclination of the hood; and
    c. a local deflection of less than 0.5 cm due to a 10 kg load placed on a 6 cm diameter area of the hood.

13. The hood of claim 1, wherein the hood can be closed from an open configuration by pulling from a corner of the hood.

14. The hood of claim 1, wherein the reinforcements are formed integrally with the thermoplastic central cover.

15. The hood of claim 1, wherein a load applied to the center of the central cover is distributed across greater than or equal to 75% of the central cover.

16. The hood of claim 15, wherein a load applied to the center of the central cover is distributed across greater than or equal to 85% of the central cover.

17. A vehicle comprising: a structural body, an engine, and the hood of claim 1.

* * * * *